Patented July 12, 1938

2,123,372

UNITED STATES PATENT OFFICE 2,123,372

PROCESS FOR THE MANUFACTURE OF AMMONIUM DITHIOCARBAMATE

Roger A. Mathes, Akron, Ohio, assignor to The B. F. Goodrich Company, New York, N. Y., a corporation of New York No Drawing. Application September 30, 1937, Serial No. 166,588

7 Claims. (Cl. 260—112)

This invention relates to the manufacture of for the manufacture of ammonium dithiocarbamate.

The objects of this invention are the manufacture of ammonium dithiocarbamate of high purity, in yields which approach the theoretical and at an economical cost. These objects have not been previously attainable by the methods described in the literature.

Previous workers used alcohol as a diluting medium or diluent for the interaction of carbon disulfide and ammonia to form ammonium dithiocarbamate. Poor yields of rather impure ammonium dithiocarbamate were obtained.

According to the present invention, carbon disulfide is dissolved in an organic nitro compound which serves as a diluent, and ammonia is passed in. Ammonium dithiocarbamate is formed as a crystalline compound and precipitates almost immediately.

Organic nitro compounds which may be used as diluents according to the invention include, among others, liquid aromatic nitro compounds, as nitrobenzene, o-nitrotoluene, nitrocymene. Such compounds with an alkoxy group on the aromatic ring, as o-nitro anisol, are also useful diluents.

The reaction is preferably carried out in a reactor provided with some cooling device such as a jacket for circulating brine. Approximately one molecular proportion of carbon disulfide is dissolved in the diluting nitro compound. Approximately two molecular proportions of ammonia are passed in, with agitation.

A temperature range of 15°–35° C. is convenient for operating purposes and gives satisfactory results. Higher or lower temperatures may also be employed.

The reaction can also be carried out at a pressure greater than atmospheric in which case loss of ammonia is prevented.

After a short period of ammonia addition, ammonium dithiocarbamate crystallizes out, being only sparingly soluble in the diluting organic nitro compounds commonly employed. When the required amount of ammonia has been added, agitation is preferably continued for a short time, and the ammonium dithiocarbamate is then filtered off. The product may be air dried to remove diluent. If higher boiling nitro compounds are employed, a wash with an inert, volatile solvent is desirable.

A modification in this procedure may be adopted when a water solution of ammonium dithiocarbamate is desired. Water is added to the suspension of ammonium dithiocarbamate in the diluting nitro compound, the product is readily dissolved, and its water solution separated from the diluent. An advantage of this alternative method is the fact that a water solution of ammonium dithiocarbamate is more stable than the dry powder.

The following examples describe the process more specifically, but it will be understood that the invention is not limited to these details. Wide variations both in the process and amounts of reactants are possible without materially affecting the results.

Example 1

107 g. of carbon disulfide are dissolved in 500 cc. of nitro benzene in a reaction flask. Over a period of about two hours, 45 g. of ammonia are passed in, with agitation. After a few minutes of ammonia addition, light yellow crystals of ammonium dithiocarbamate start to precipitate. The temperature is maintained at 25°–30° C. during the course of the reaction.

After all the ammonia has been added, the thick reaction mixture is allowed to agitate about fifteen minutes, then filtered and washed with hexane. The dry weight is 137 g., representing a 93.3% yield.

Example 2

The process, essentially as described in example 1, is repeated using 107 g. of $CS_2$, 45 g. of ammonia and 500 cc. of o-nitrotoluene. The ammonium dithiocarbamate, after filtering, is washed with hexane and dried. The dry weight is 135 g., representing a 92% yield.

From the data herein presented, the fact will be readily apparent that this invention constitutes a distinct improvement over previous processes for preparing ammonium dithiocarbamate. Yields have been increased to over 90%. The quality of ammonium dithiocarbamate has been greatly improved making purification unnecessary before use of the compound for synthetic work. By this improvement in quality, a distinctly more stable compound is obtained. Conditions for its preparation according to this invention do not require close control. A wide temperature range may be used; the amounts of reactants may be varied greatly from those theoretically required, without affecting adversely either the yield or quality of ammonium dithiocarbamate produced.

I claim:

1. A process for the manufacture of ammonium dithiocarbamate which comprises interacting ammonia and carbon disulfide in the presence of a liquid, aromatic nitro compound.

2. A process for the manufacture of ammonium dithiocarbamate which comprises interacting substantially two molecular proportions of ammonia with substantially one molecular proportion of carbon disulfide in the presence of a liquid, aromatic nitro compound.

3. A process according to claim 1 where the ammonium dithiocarbamate formed is water extracted from the suspension in a diluting, aromatic nitro compound.

4. A process for the manufacture of ammonium dithiocarbamate which comprises interacting ammonia and carbon disulfide in the presence of nitrobenzene.

5. A process for the manufacture of ammonium dithiocarbamate which comprises introducing substantially two molecular proportions of gaseous ammonia into substantially one molecular proportion of carbon disulfide in the presence of nitrobenzene.

6. A process for the manufacture of ammonium dithiocarbamate which comprises interacting ammonia and carbon disulfide in the presence of o-nitrotoluene.

7. A process for the manufacture of ammonium dithiocarbamate which comprises introducing substantially two molecular proportions of gaseous ammonia into substantially one molecular proportion of carbon disulfide in the presence of o-nitrotoluene.

ROGER A. MATHES.